(12) United States Patent
Steffensen et al.

(10) Patent No.: US 7,980,338 B2
(45) Date of Patent: Jul. 19, 2011

(54) AGRICULTURAL IMPLEMENT HAVING APPARATUS FOR STOWING PTO DRIVELINE SHAFT WHEN THE PTO DRIVELINE SHAFT IS NOT IN USE

(75) Inventors: Darwin Steffensen, Racine, WI (US); Stanley W. Ylioja, Outlook (CA); Phillip A. Reiber, Saskatoon (CA)

(73) Assignee: CNH Canada, Ltd. (CA)

( * ) Notice: Subject to any disclaimer, the term of this patent is extended or adjusted under 35 U.S.C. 154(b) by 156 days.

(21) Appl. No.: 12/493,696

(22) Filed: Jun. 29, 2009

(65) Prior Publication Data

US 2010/0327144 A1     Dec. 30, 2010

(51) Int. Cl.
 *B60K 17/28* (2006.01)
(52) U.S. Cl. ...... 180/53.1; 180/14.1; 172/272; 172/677; 56/14.7; 56/15.7
(58) Field of Classification Search ............... 180/14.1, 180/53.1, 53.3; 172/272, 275, 677, 678–680, 172/47; 56/14.7, 14.9, 15.2, 15.6, 15.7
See application file for complete search history.

(56) References Cited

U.S. PATENT DOCUMENTS

| | | | |
|---|---|---|---|
| 2,429,492 A | 10/1947 | Scranton | |
| 2,614,405 A | 10/1952 | Clausen | |
| 2,869,660 A * | 1/1959 | Krause et al. | 180/14.4 |
| 2,885,015 A | 5/1959 | Koch et al. | |
| 3,007,538 A * | 11/1961 | Hill | 180/167 |
| 3,369,628 A | 2/1968 | Heinlein | |
| 3,385,388 A | 5/1968 | Restall | |
| 4,020,913 A * | 5/1977 | Yatcilla | 180/14.1 |
| 4,058,990 A | 11/1977 | Von Allworden | |
| 4,184,558 A | 1/1980 | de Buhr et al. | |
| 4,792,006 A * | 12/1988 | Nienhaus et al. | 180/53.3 |
| 5,303,789 A | 4/1994 | Adamson et al. | |
| 6,015,016 A | 1/2000 | Anderson et al. | |
| 7,862,068 B2 * | 1/2011 | Schlesser et al. | 280/475 |
| 2007/0007052 A1 | 1/2007 | Young et al. | |

* cited by examiner

*Primary Examiner* — Ruth Ilan
(74) *Attorney, Agent, or Firm* — Rebecca Henkel

(57) ABSTRACT

A power take off (PTO) driveline shaft of an agricultural implement may be securely stowed when not in use using a PTO driveline storage device. The storage device is pivotably mounted to the frame of the agricultural implement, such as the hitch, and may be rotated from its own stowed position to a position to provide support for the PTO driveline shaft when the PTO driveline shaft is not connected to the PTO of a tractor or other machine having a PTO output. The storage device includes an arm having a first end that is mounted to the hitch and has a second end that is adapted to fit against the PTO driveline shaft when the device is being used to stow the PTO driveline shaft. When not in use, the storage device may be rotated clear of the PTO driveline shaft and pivoted to a position where it may be securely stowed.

18 Claims, 3 Drawing Sheets

AGRICULTURAL IMPLEMENT HAVING APPARATUS FOR STOWING PTO DRIVELINE SHAFT WHEN THE PTO DRIVELINE SHAFT IS NOT IN USE

BACKGROUND OF THE INVENTION

The present invention relates to a method for stowing a power take off (PTO) driveline shaft of an agricultural implement when the driveline shaft is not coupled to the PTO of a towing vehicle or other PTO source.

Many vehicles, implements and other types of equipment include an articulated framework having a pivot assembly across which a plurality of hydraulic fluid hoses pass for conveying pressurized fluid to, and conveying return fluid from hydraulic components carried by one part of the framework. The applications most readily apparent are in the agricultural industry, where tractors provide pressurized hydraulic fluids to a trailing implement affixed to the rear of the tractor by a hitch. The implement can be any of a multitude of known soil preparation, crop planting, harvesting or crop-treating machines, all of which affix to the drawbar of the tractor for pivotal movement as the tractor and implement move around the field. In most cases, at least part of the power required by the implement is provided by the tractor, in the form of pressurized hydraulic fluid that is supplied to the various hydraulic components on the implement by flexible hydraulic hoses or rigid conduits-usually flexible hoses spanning the gap between the tractor and the implement. In many such implements, PTO power is also required, so a PTO driveline shaft is connected to the PTO output shaft on the tractor and extends across the pivot connection between the tractor drawbar and the implement. A universal joint on both ends of the coupler and a telescoping length adjustment permits the shaft alignment some flexibility and provides for turning of the tractor/implement combination. When the PTO driveline shaft and coupler are not connected to the tractor, it is usually removed, or left to dangle in location.

SUMMARY OF THE INVENTION

The present invention is directed to an apparatus for stowing the PTO driveline shaft when the PTO driveline shaft is not in use. Moreover, the apparatus is designed to be moved to a position generally clear of the PTO driveline shaft when the apparatus is not in use. Thus, the present invention provides a mechanism for stowing the PTO driveline shaft when the PTO driveline shaft is not coupled to the PTO of the tractor but that can be moved to its own stowed position when not being used to stow the PTO driveline shaft.

It is therefore an object of the present invention to provide a stowable PTO driveline shaft support holder that can be stowed clear of the PTO driveline shaft when not being used to provide support for the PTO driveline shaft.

It is another object of the present invention to provide a PTO driveline shaft support holder that may be secured to the agricultural implement when not being used to support the PTO driveline shaft.

It is another object of the invention to provide a convenient method of storage for the PTO driveline shaft of an agricultural implement when the implement is disconnected from the PTO of a tractor or other machine.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
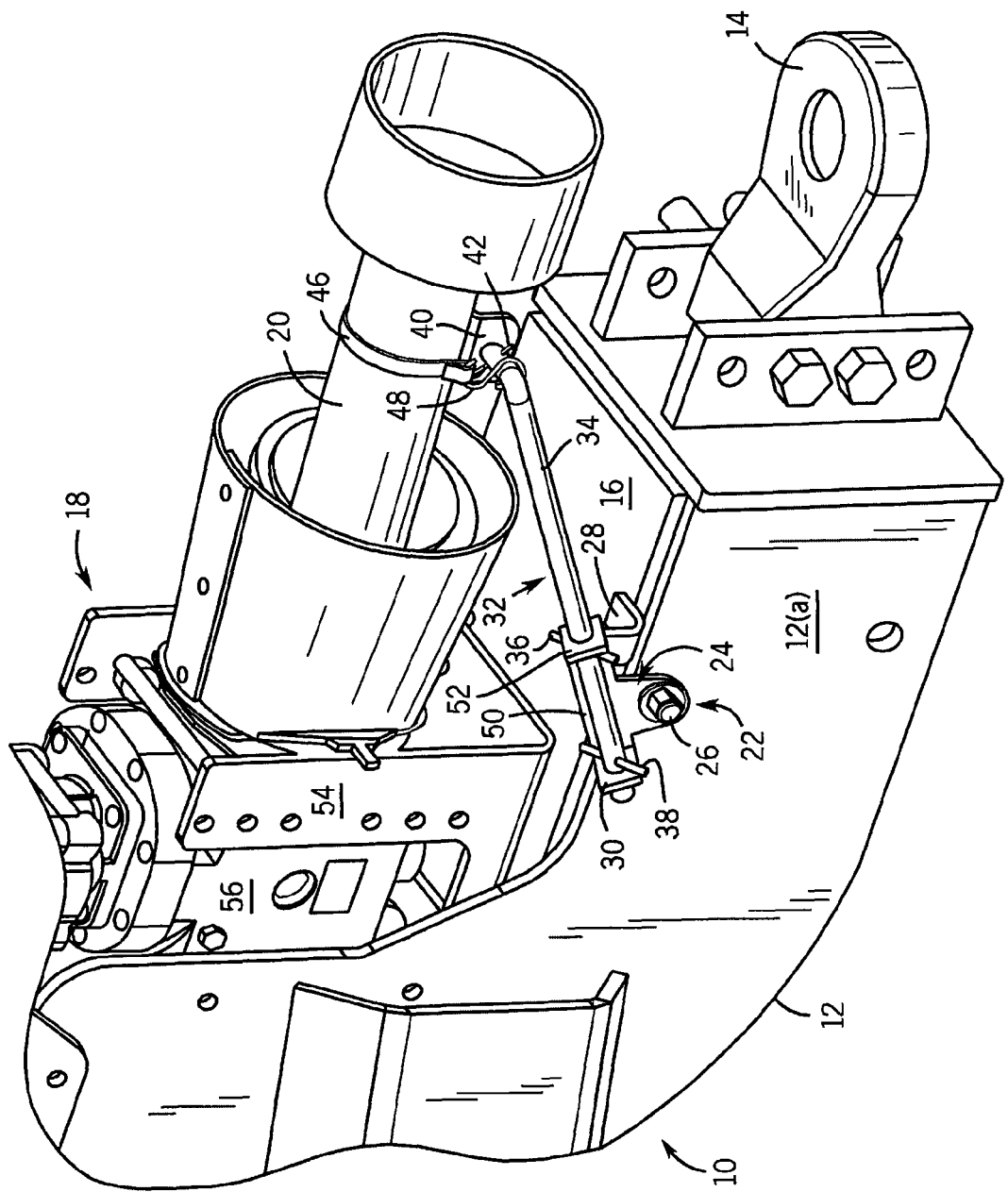
FIG. 1 is a front isometric view of a portion of an agricultural implement that includes a PTO driveline shaft and a PTO driveline shaft holder according to the present invention for supporting the PTO driveline shaft in a stowed position.

Referring now to the drawings, and more particularly to FIG. 1, the front portion of an agricultural implement 10 designed to be coupled to a tractor is shown. The actual function of implement 10 is not important to the present invention, it only being necessary to understand that it may take many forms. Additionally, item 10 need not necessarily be an agricultural implement, but could be an altogether different type of equipment and instead of a tractor, a specialized drive unit could be used, or a truck with a PTO output.

The implement 10 has a forwardly extending tongue 12 that terminates in a hitch 14. The hitch 14 may be pivotably coupled to the drawbar (not shown) of a tractor (not shown) using a removable hitch pin (not shown), as known in the art. The tongue 12 has a generally planar upper surface 16 that provides support for a hydraulic pump apparatus 18 that is partially powered by the engine (not shown) of the tractor. More particularly, a PTO driveline shaft 20 associated with the pump apparatus 18 interfaces with the PTO stub shaft (not shown) of the tractor. The PTO stub shaft transfers rotary power to the PTO driveline shaft 20 through a coupler (not shown) that interfaces with the PTO stub shaft. Preferably, the coupler is a telescoping member to adjust for varying distances between the forward end of the PTO driveline shaft and the PTO stub shaft, and has universal joint at each end to allow for further alignment discrepancies. There may be some situations where the PTO driveline shaft connects directly to the tractor stub shaft. In such case, some other provisions will have to be relied upon to accommodate the distance variations mentioned.

When the PTO driveline shaft 20 is coupled to the PTO stub shaft of the tractor, either directly or via the coupler, the otherwise free end of the PTO driveline shaft is effectively supported by stub shaft of the tractor. However, when the PTO driveline shaft 20 is not engaged with the PTO stub shaft, the PTO driveline shaft 20 may hang downwardly if not properly supported. To provide support for the PTO driveline shaft 20 when the PTO driveline shaft is not engaged with the PTO stub shaft, the present invention provides a storage assembly 22 that is operative to support and stow the PTO driveline shaft 20 when in use and movable to be clear of the PTO driveline shaft 20 when not in use.

The storage assembly 22 includes a mounting bracket or lug 24 that is pinned to a side wall 12(a) of the tongue 12 by a fastener 26, e.g., bolt. The mounting bracket 24 has a pair of spaced apart flanges 28, 30, each of which has a hole (not numbered) formed therein. The assembly 22 also includes a support arm 32 that is coupled to the mounting bracket 24. More particularly, the support arm 32 has a shaft 34 that is passed through the holes in the flanges 28, and is secured in place by a pair of roll pins 36, 38. The holes in the flanges 28, 30 are slightly larger than the diameter of the shaft 34 to allow rotation of the shaft 34. As seen in FIG. 1, the roll pins 36, 38 prevent the shaft 34 from being pulled or withdrawn from the mounting bracket 24 but allow rotation of the shaft 34. It will also be appreciated that the support arm 32 can be disconnected from the mounting bracket 24 when desired by removing the roll pins 36, 38 and withdrawing the support shaft 34 from the mounting bracket 24.

As shown in FIG. 1, one end of the support arm 32 is connected to the mounting bracket 24. The opposite end of the support arm 32 has a saddle 40 that is designed to fit against the underside of the PTO driveline shaft 20 when the storage assembly 22 is in use. The saddle 40 has a curved body that includes a pair of opposed holes (not numbered) through which the support arm 32 shaft 34 may be passed to fit the saddle 40 onto the shaft 34. Two cotter pins 42, 44 may then be used to secure the saddle 40 to the shaft 34.

As noted above, when the PTO driveline shaft 20 is being stowed using the storage assembly 22, the saddle 40 fits against an underside of the PTO driveline shaft 20. The storage assembly 22 further includes a strap 46, or other curvilinear member, that fits against the topside PTO driveline shaft 20 opposite the saddle 40. The strap 46 has a pair of hooked ends 48 that removably engage the support shaft 34 on opposite sides of the saddle 40. The strap 46 helps to secure the PTO driveline shaft 20 against the saddle 40.

Still referring to FIG. 1, the mounting bracket 24 includes a wall 50 that interconnects flanges 28, 30. Extending from the wall 50 is an L-shaped stop 52 that is designed to sit against the top surface 16 of the tongue 12 when the support arm 32 is being used to support the PTO driveline shaft 20. The stop 52 holds the position of the mounting bracket 24 and provides weight bearing support for the support arm 32 when the arm 32 is holding up the PTO driveline shaft 20.

Figure 2:
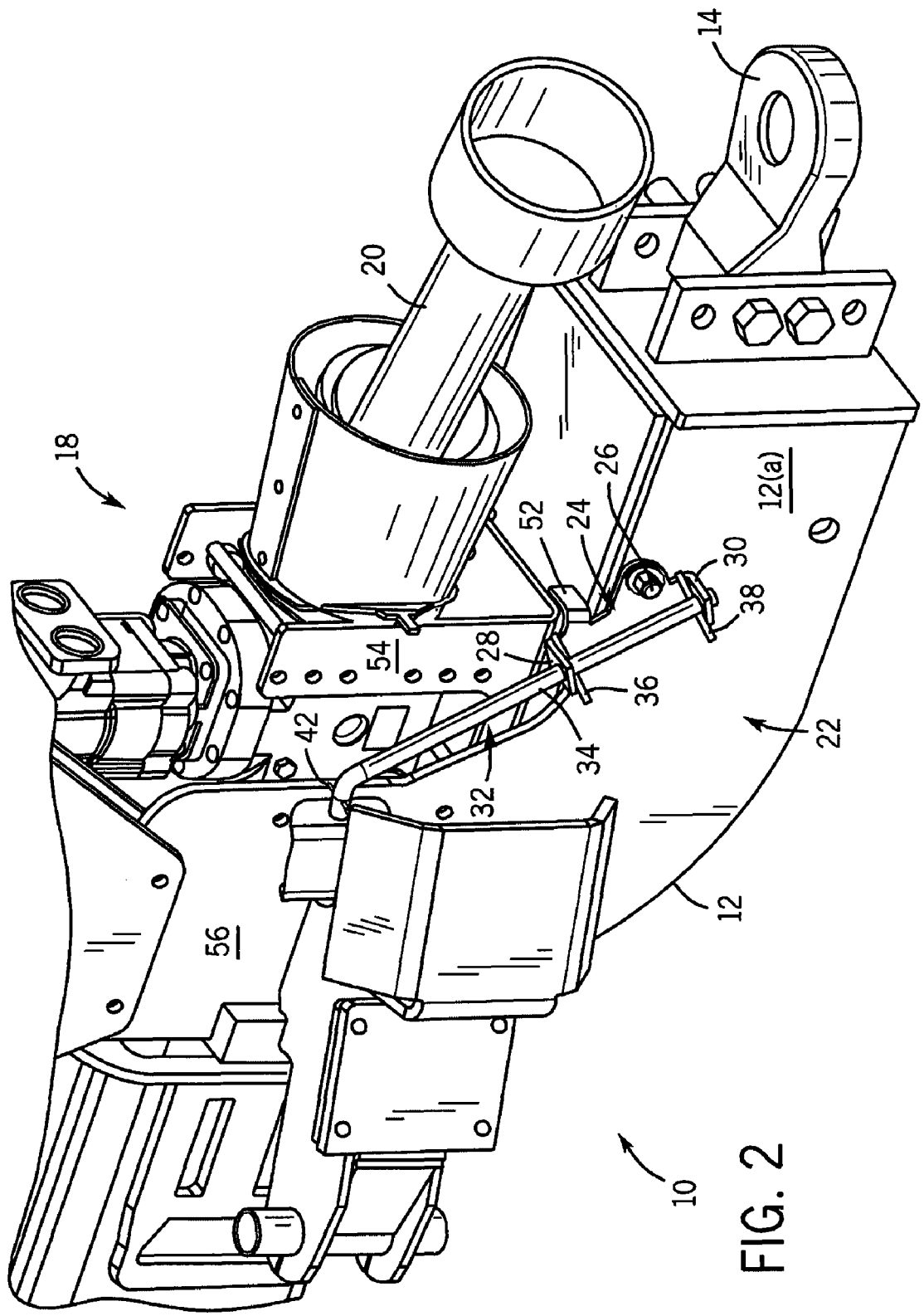
FIG. 2 is a front isometric view of the agricultural implement similar to FIG. 1 showing the PTO driveline shaft holder in its non-use stowed position.

The storage assembly 22 is designed to pivot clear of the PTO driveline shaft 20 when not in use. The stowed position for the storage assembly 22 is shown in FIG. 2. To stow the storage assembly 22, the support arm 32 is pivoted about fastener 26 toward the aft of the agricultural implement. The support arm 32 may be pivoted toward the aft of the implement until stop 52 sits against a portion of the mount 54 for the hydraulic pump apparatus 18. As also shown in FIG. 2, the saddle 40 rests against a sidewall 56 of the tongue 12. The storage assembly 22 is held in this rearward stowed position by the weight of the storage assembly. It will thus be appreciated that the support arm 32 must be rotated approximately 90 degrees to change the orientation of the saddle 50 from its in-use position shown in FIG. 1 to its stowed position shown in FIG. 2.

Figure 3:
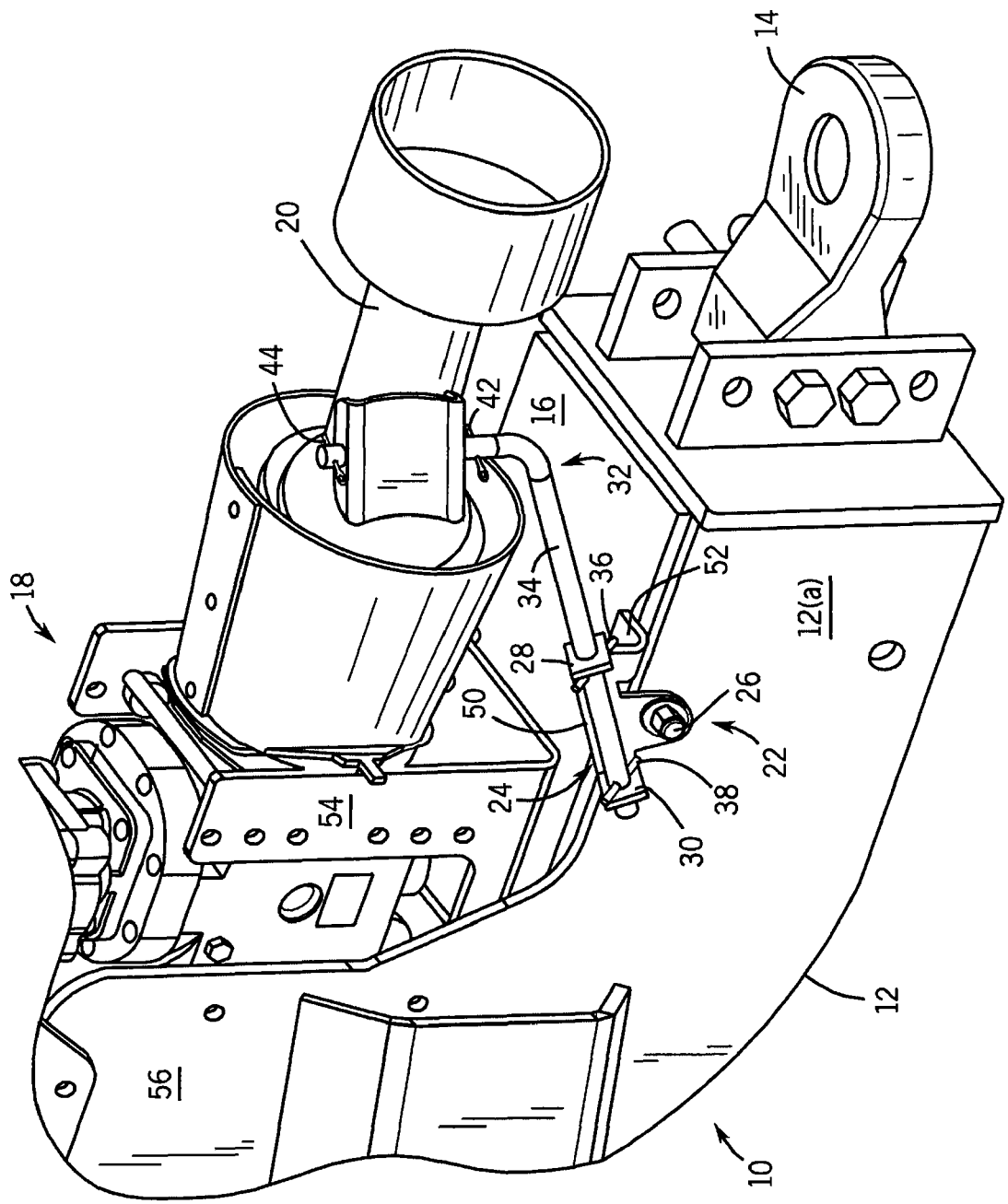
FIG. 3 is a front isometric view of the agricultural implement similar to FIGS. 1 and 2 with the PTO driveline shaft holder in a forward rotated position.

Similarly, when the storage assembly 22 is being moved from its stowed position (FIG. 2) to its in-use position (FIG. 1), the storage arm 32 is rotated in the opposite direction. FIG. 3 shows the storage arm 32 pivoted away from its stowed position toward the forward end of the implement but before the saddle 40 has been rotated into a position to support the PTO driveline shaft 20. Preferably, the storage assembly 22 is placed in its in-use position before the PTO driveline shaft 20 is disconnected from the PTO stub shaft (or coupler) of the tractor. Since the connection of the PTO driveline shaft 20 with the PTO of the tractor holds the PTO driveline shaft 20 in a raised position, the storage assembly 22 can be placed in its in-use position without requiring manual lifting of the PTO driveline shaft 20. If the PTO driveline shaft 20 was disconnected from the PTO of the tractor before the storage assembly 22 was put into position, the weight of the PTO driveline shaft 20 would cause the PTO driveline shaft 20 to hang, thereby placing stresses on the connection of the PTO driveline shaft 20 with the hydraulic pump apparatus 18 and also require manual lifting of the PTO driveline shaft 20 to position the saddle 40 against the underside of the PTO driveline shaft 20. Also, since the storage assembly 22 holds the PTO driveline shaft 20 in a raised position, the PTO driveline shaft 20 can be connected to the PTO of the tractor without requiring manual lifting of the PTO driveline shaft 20. Therefore, it is preferred to keep the storage assembly 22 in its in-use position until the PTO driveline shaft 20 is connected to the PTO of the tractor. It will also be appreciated that the strap described above may be secured to the implement, the support arm, or other structure when the storage assembly is in its stowed position.

It will be appreciated that the present invention provides a mechanism for supporting a PTO driveline shaft when the shaft is not connected to a PTO of a tractor or other machine providing a PTO output. Moreover, when the mechanism is not in use, it can be stowed on the implement in a tool-free manner.

Many changes and modifications could be made to the invention without departing from the spirit thereof. The scope of these changes will become apparent from the appended claims.

We claim:

1. An apparatus for use with an agricultural implement having a frame supporting a power take-off (PTO) drive line shaft adapted to connect to a PTO, the apparatus comprising:
   a mounting bracket mounted to the frame;
   a pin mounting the mounting bracket to the frame, wherein the pin allows the mounting bracket to pivot relative to the frame;
   a driveline shaft support structure having a first end coupled to the mounting bracket and a second end adapted to engage the drive line shaft when the drive line shaft is being placed in a stowed, non-use position;
   wherein the support structure includes a support arm having a first end coupled to the mounting bracket and a second end that includes a saddle that is adapted to be positioned against a lower surface of the driveline shaft when the driveline shaft is being placed in the stowed, non-use position;
   wherein the support structure may be pivoted away from the drive line shaft when the drive line shaft is coupled to the PTO; and
   a pair of roll pins coupling the support arm to the mounting bracket.

2. The apparatus of claim 1 further comprising a retainer adapted to be removably engaged with the saddle, wherein the retainer is configured to fit against a top surface of the driveline shaft opposite the saddle and be coupled to the saddle to hold the driveline shaft against the saddle.

3. The apparatus of claim 2 further comprising at least one pin that couples the retainer to the saddle.

4. The apparatus of claim 3 wherein the retainer is a strap having a first end and a second end spaced from the first end by a curvilinear body, and wherein each end is curved so as to engage the support arm.

5. The apparatus of claim 3 further comprising a pair of cotter pins to secure the saddle to the support arm.

6. The apparatus of claim 1 further comprising a stop associated with the mounting bracket that limits forward pivoting of the support structure, wherein the stop is configured to engage a portion of the frame to limit further forward pivoting of the support structure.

7. The apparatus of claim 6 wherein the frame includes a hitch supporting portion, and wherein the stop is configured to abut against the hitch supporting portion to limit further forward pivoting of the support structure.

8. The apparatus of claim 7 wherein the hitch supporting portion has a top surface and a side surface, and wherein the stop is configured to abut against the top surface when limiting forward pivoting of the support structure, and wherein the mounting bracket is mounted to the side surface.

9. An agricultural implement comprising:
a frame carrying a hitch for coupling the frame to a towing vehicle;
a PTO driveline shaft carried by the frame and configured to be coupled to a PTO of the towing vehicle;
a mounting lug coupled to the frame by a pin that permits rotation of the mounting lug relative to the frame;
an arm having a first end and a second end, wherein the first end is pinned to the mounting lug such that the arm rotates with rotation of the mounting lug, and wherein the arm is adapted to support the PTO drive line shaft when the PTO drive line shaft is decoupled from the PTO of the towing vehicle; and
a retainer at the second end of the arm and adapted to hold the PTO drive line shaft when the PTO drive line shaft is being stowed in a non-use position decoupled from the PTO of the towing vehicle.

10. The implement of claim 9 wherein the retainer includes a saddle that is adapted to be positioned against a lower surface of the PTO drive line shaft when the PTO drive line shaft is being placed in the stowed, non-use position.

11. The implement of claim 10 further comprising a pair of roll pins coupling the arm to the mounting lug.

12. The implement of claim 9 wherein the retainer further includes a curvilinear device adapted to be removably engaged with the arm, wherein the curvilinear device is configured to fit against a top surface of the PTO drive line shaft opposite the saddle and has a pair of ends that engage the arm to hold the PTO driveline shaft against the saddle.

13. The implement of claim 9 further comprising a first cotter pin and a second cotter pin to couple the retainer to the arm.

14. The implement of claim 9 further comprising a stop integrally formed with the mounting lug that limits forward rotation of the mounting lug, wherein the stop is configured to engage a portion of the toolbar to limit further forward rotation of the mounting lug and the arm.

15. The implement of claim 14 wherein the frame includes a hitch supporting portion, and wherein the stop is configured to abut against the hitch supporting portion to limit further forward rotation of the mounting lug.

16. The implement of claim 15 wherein the hitch supporting portion has a top surface and a side surface, and wherein the stop is configured to abut against the top surface when limiting forward rotation of the mounting lug, and wherein the mounting lug is mounted to the side surface.

17. The implement of claim 9 further comprising means for securing the arm in a stowed position when the arm is not being used to stow the PTO drive line shaft.

18. An agricultural planter comprising:
a frame;
a hitch carried by the frame for coupling the planter to a towing vehicle, the towing vehicle having a PTO;
a PTO driveline shaft for coupling to the PTO of the towing vehicle;
a mounting lug coupled to the frame by a pin that permits rotation of the mounting lug relative to the frame;
an arm having a first end and a second end, wherein the first end is pinned to the mounting lug such that the arm rotates with rotation of the mounting lug, and wherein the arm is adapted to support the PTO driveline shaft when the PTO drive line shaft is decoupled from the PTO of the towing vehicle;
a retainer at the second end of the arm and adapted to hold the PTO driveline shaft when the PTO driveline shaft is being stowed in a non-use position decoupled from the PTO of the towing vehicle, wherein the retainer includes a saddle that is adapted to be positioned against a lower surface of the PTO drive line shaft when the PTO drive line shaft is being placed in the stowed, non-use position and wherein the retainer includes a curvilinear device adapted to be removably engaged with the arm, wherein the curvilinear device is configured to fit against a top surface of the PTO driveline shaft opposite the saddle and engage the arm to hold the PTO driveline shaft against the saddle;
a pair of roll pins coupling the arm to the mounting lug; and
a stop integrally formed with the mounting lug that limits forward rotation of the mounting lug, wherein the stop is configured to engage a portion of the frame to limit further forward rotation of the mounting lug and the arm.

* * * * *